Patented May 1, 1945

2,374,814

UNITED STATES PATENT OFFICE 2,374,814

METHOD OF PRODUCING MODIFIED PHENOL ALDEHYDE RESIN

Samuel S. Gutkin, Brooklyn, N. Y., assignor to Falk & Company, Carnegie, Pa., a corporation of Pennsylvania No Drawing. Application August 14, 1943, Serial No. 498,730

8 Claims. (Cl. 260—44)

This invention relates to a specialized resinous phenol-aldehyde alkyd product and relates more particularly to phenol-aldehyde alkyd products the specific properties of which are determined by a specialized modification in the series of stages by which the resinous product is made. The application herein is a continuation-in-part of my application Serial No. 306,291, filed November 27, 1939, now Patent No. 2,329,045, and my application Serial No. 435,752, filed March 21, 1942.

Primarily the object of my invention is so to link the alkyd reactions to a phenol-aldehyde condensate of the infusible, "Resite" or "Bakelite" type that there is obtained a resin possessing certain inherent properties of phenol-aldehyde resins of that sort, such as the capacity to acquire density and gloss in a film, coupled in measure with the alkyd properties of flexibility, durability, and susceptibility to modification; by so conducting the process by which the resin is produced that fusibility or solubility is retained in the reaction mass, or batch, during the formation of the resin without impairing in the product those characteristics of a full heat-hardening resin which have been above noted.

The further and more specific object of my invention and the feature in which the resin which is the subject matter hereof differs from the resin specifically claimed in my above noted application Serial No. 306,291 is to utilize as a modifying component included in the resin one of the aromatic monocarboxylic acids or a mixture of such acids. By the term "aromatic monocarboxylic acids" as herein used, I intend primarily to distinguish from the fatty oil acids, all of which are straight chain acids having more than 10 carbon atoms in their carbon chains; and also to distinguish from the lower acyclic monocarboxylic acids having no more than 10 carbon atoms in their non-nuclear structure attached to the carboxyl.

The resinous products made in accordance with my invention differ from those disclosed in my above identified application Serial No. 306,291 by being as a class somewhat softer and more soluble than those other products, and by having greater adhesiveness. They differ slightly from each other, but have in common the properties of film-formation, adhesion, and strength. All are homogeneous products in that they exhibit no inherent tendency toward separation after their formation.

Generally stated my invention includes the initial formation of a phenol-aldehyde condensation product which would be, if unmodified, of the "Resite" or "Bakelite," or full heat-hardening and infusible sort, and includes the involvement of that initial condensate in reactions and modifications conducted with such determining and modifying reagents, and under such conditions that the fusibility and solubility of the reaction batch is maintained throughout the process and in measure is retained in the final product while also retaining in the product fundamental characteristics of the infusible phenol-aldehyde condensates. This I do by effectively reacting the fundamentally infusible phenol-aldehyde condensate with an unmodified polyhydric alcohol and then with a polybasic carboxylic acid without destroying the above noted desirable properties inherent in the infusible phenol-aldehyde resins.

Following this I modify the resultant resinous product of condensation and partial esterification with a cyclic monocarboxylic acid.

As typical examples of aldehydes which may be reacted with phenol to give the phenol-aldehyde condensate, I may name acetaldehyde, butyraldehyde, propylaldehyde, crotonaldehyde, and formaldehyde. As typical examples of unmodified polyhydric alcohols usable in my process, I may give glycerine, triethylene glycol, diethylene glycol, pentaerythritol, and sorbitol. As typical of polybasic carboxylic acids which may be used, I may give phthalic anhydride, maleic anhydride, malic acid, and fumaric acid. It may be stated generally that I may use in my process any aldehyde, any unmodified polyhydric alcohol, and any polybasic carboxylic acid of the sort found suitable in the alkyd resin art.

As typical of the aromatic monocarboxylic acids which I use, I may give benzoic acid, ethyl-benzoic acid, methyl-benzoic acid, anthranilic (amino-benzoic) acid, tropic acid, hydratropic acid, phenyl-acetic acid, tolyl-acetic acid, salicylic acid, cinnamic acid, hydro-cinnamic acid, and amino-cinnamic acid.

*Example No. 1*

I mixed 300 grams of commercial (approximately 40%) formaldehyde and 221 grams of commercial (approximately 100%) meta-para-cresol with at least 3.5 cc. sodium hydroxide catalyst in a concentration of 250 milligrams per cc. This mixture was refluxed until the first sign of separation of water occurred. Such separation is indicated by clouding in a cooled sample, or region, of the reaction mass; and may be observed for instance in the cooled region of a glass reaction flask forming part of experimental or checking apparatus. Upon the appearance of such cloud, and cooling the batch, an opaque mass of resinous condensate formed, together with an appreciable quantity of free water.

It is to be understood that both the meta-para-cresol and the formaldehyde of this example are common commerical materials, the formaldehyde being approximately 40% by volume and the meta-para-cresol being of usual commercial purity.

Taking 50 grams of the condensate thus formed I washed it several times with water and removed as much water as possible by decantation and squeezing, in accordance with my preferred practice. Prior to any additional heating of the condensate I mixed with it 154 grams of high-test glycerine forming a homogeneous mass. I then added 148 grams of phthalic anhydride and heated the mixture until the water of reaction came off as vapor and the phthalic anhydride was fused. It is desirable that the temperature should not be raised substantially above 320° F. until a further addition is made by adding the selected monocarboxylic acid to the reaction mass, or batch.

I have found that I may first heat to drive off water from the homogeneous mass formed from the condensate and the glycerine and then add the polybasic carboxylic acid, or may add both the glycerine and the polybasic carboxylic acid before heating and then heat. The point is that in either case opportunity is given the glycerine as representative of the unmodified polyhydric alcohols so to interact with the condensate as to form a homogeneous fusible mass therewith before reaction with the polybasic carboxylic acid takes place, so that the product of reaction with the polybasic carboxylic acid remains clear and homogeneous.

The resultant product, if subjected to continued heating to a temperature higher than 320° F., is a clear resinous material of plastic type, but less brittle than the simple phenol-formaldehyde condensate which forms its base. It is, however, after reaction with the phthalic anhydride still susceptible to modification into products of fusible and soluble sort. It will be noted that to retain the fusibility of this intermediate product the condensate content of which is fundamentally of the infusible type I utilize an unmodified polyhydric alcohol which is effective to keep the condensate in soluble condition for reaction with the polybasic carboxylic acid.

In effecting modification of the resinous material formed as above by effective esterification of the condensate and reaction with the phthalic anhydride, heating of the material is continued and held to the formation of a clear bead. At that stage and without permitting the material to gel, I added 73 grams of benzoic acid with heating from the maximum temperature of the stage next preceding to a temperature of about 400° F. With benzoic acid, as with the other monocarboxylic acids of the class herein disclosed, a temperature of about 400° F. was adequate to incorporate the monocarboxylic acid in the reaction batch without clouding. The batch may, if desired, be brought to a temperature substantially above 400° F., if care be taken to cease heating when the first signs of gelation appear in the batch.

The product was a solid, viscous, opaque resinous material of straw color. It is indicated for use in adhesives, as a plasticizer for nitro-cellulose, and other cellulose materials, and when extended with suitable solvent, such as the aromatic hydrocarbon solvents, ester solvents, alcohols, ketones, catalytic solvents, or mixtures of such solvents, it is useful as a varnish coating.

As a variation under this same example, it may be noted that I have added as much as 100 grams of benzoic acid, making the addition by small increments to avoid separation. It may be noted that in this example, and as a fact running through all the exemplifications of my method, that the greater the proportional addition of the monocarboxylic acid the less viscous will the product be, and the greater will be its solubility in the common organic solvents.

*Example No. 2*

The procedure of this example was identical with that of Example No. 1 and the materials used were identical with the materials of that example, except that 98 grams of maleic anhydride were used to replace the 148 grams of phthalic anhydride used in Example No. 1.

*Example No. 3*

The procedure of this example was identical with that of Example No. 1 and the materials used were identical with those of that example, except that 116 grams of fumaric acid were used instead of 148 grams of phthalic anhydride used in Example No. 1.

It should be noted that examples paralleling Examples Nos. 2 and 3 are not hereinafter given in conjunction with the use of other variable compounds within the bounds of my invention as herein broadly disclosed. It is, however, to be understood that in every subsequent example in which the use of phthalic anhydride is indicated, approximately an equivalent molar content of maleic anhydride, fumaric acid, or other polybasic carboxylic acid may be used equivalently to the phthalic anhydride as the polybasic carboxylic acid component of my resin, the procedure in each instance being identical with that described when phthalic anhydride was used. I have observed only slight differences between the products in which phthalic anhydride was used as the polybasic carboxylic acid and those products in which some other polybasic carboxylic acid was used.

*Example No. 4*

In this example the procedure and materials of Example No. 1 were duplicated down to the final stage, in which stage salicylic acid was added as the aromatic monocarboxylic acid in place of the benzoic acid used in Example No. 1.

That is, to 50 grams of the resinous condensate made as in Example No. 1, I added 154 grams of high-test glycerine, which formed a homogeneous mass with the condensate. Similarly to the procedure of Example No. 1, 148 grams of phthalic anhydride was added and the mixture was heated to about 300° F. until capable of forming a clear bead.

Then 76 grams of salicylic acid was added, and heating was continued until the temperature reached about 400° F., at which temperature all the salicylic acid went into the batch. The batch was cooled.

The product was a solid, viscous, clear, resinous material of particularly pale color. The same uses are indicated for this product as for the product obtained by modification with benzoic acid.

Example No. 5

In this example the procedure and materials of Example No. 1 were duplicated down to the final stage, in which stage 50 grams of cinnamic acid were used as the cyclic monocarboxylic acid in place of the benzoic acid added in Example No. 1. The 50 grams of the cinnamic acid were added in small increments while raising the temperature of the reaction mass, or batch, from the maximum temperature of the next preceding stage of the process to a temperature slightly above 400° F. At such temperature all of the cinnamic acid quickly went into the batch with the formation of a slight cloud to give when cooled an opaque resinous product of a milky appearance. The exposed surface turned tan in color.

Example No. 6

In this example the procedure and materials of Example No. 1 were duplicated down to the final stage, in which stage 82 grams of anthranilic acid were used as the monocarboxylic acid in place of the benzoic acid added in Example No. 1. The anthranilic acid was added in small increments while raising the temperature of the reaction mass, or batch, from the maximum temperature of the next preceding stage of the process to a teperature slightly above 400° F. At such temperature all the anthranilic acid quickly went into the batch to give when cooled a semi-transparent, semi-solid resinous product of a yellow-orange color closely similar to the product obtained in Example No. 5.

Example No. 7

In this example the procedure and materials of Example No. 1 were duplicated down to the final stage in which stage 98 grams of phenyl-acetic acid were used as the monocarboxylic acid in place of the benzoic acid added in Example No. 1. The phenylacetic acid was added in small increments while raising the temperature of the next preceding stage of the process to a temperature slightly above 400° F. At such temperature all the phenyl-acetic acid quickly went into the batch to give when cooled a very light-colored, semi-solid, viscous resinous material.

Example No. 8

I mixed 215 grams of commercial phenol (approximately 100%) with 165 grams of commercial acetaldehyde (approximately 100%) together with 11 cc. of sodium hydroxide catalyst in a concentration of 250 milligrams per cc. This mixture was refluxed until the first sign of separation of water occurred. Such separation is indicated by clouding in a cooled sample or region of the reaction mass and may be observed, for instance, in the cool region of the glass reaction flask forming part of the experimental or checking apparatus. Upon the appearance of such cloud and cooling the batch, an opaque mass of resinous condensate is formed together with an appreciable quantity of free water.

Taking 50 grams of the condensate thus formed, I mixed with it 154 grams of high-test glycerine forming a homogeneous mass. I then added 148 grams of phthalic anhydride with heating to a temperature of about 300° F., to drive off the water of reaction as a vapor and to fuse the phthalic anhydride. During this procedure, I was careful that the temperature was not raised substantially above 320° F. pending the next stage of the process.

In effecting modification of the resinous material formed as above by partial esterification of the condensate in reaction with the phthalic anhydride, heating of the batch was continued and was held until the batch was capable of forming a clear bead. At that stage and without permitting the material to gel, I added 73 grams of benzoic acid with heating of the batch from the maximum temperature of the stage next preceding, which is about 300° F., to a temperature of about 400° F. The batch was held at that latter temperature for a short time, and then cooled.

The product was a very dark and clear viscous semi-solid resinous material.

The procedure and materials of Example No. 8 were duplicated down to the final modification, in which stage I added in one instance salicylic acid and in another instance cinnamic acid. In both cases there is only slight difference in the product from the product obtained in Example No. 8.

Example No. 9

I mixed 300 grams of formaldehyde (approximately 40%) and 215 grams of phenol (approximately 100%) with 11 cc. of sodium hydroxide catalyst in a concentration of 250 milligrams per cc. This mixture was refluxed until the first sign of separation of water occurred. Such separation is indicated by clouding in a cooled sample, or region, of the reaction mass; and may be observed for instance in the cooled region of a glass reaction flask forming part of experimental or checking apparatus. Upon the appearance of such cloud, and cooling the batch, an opaque mass of resinous condensate formed, together with an appreciable quantity of free water.

Taking 50 grams of the condensate thus formed I washed it several times with water and removed as much water as possible by decantation and squeezing, in accordance with my preferred practice. Prior to any additional heating of the condensate, I mixed with it 154 grams of high-test glycerine forming a homogeneous mass. I then added 148 grams of phthalic anhydride and heated the mixture to such temperature (about 300° F.) that the water of reaction came off as vapor and the phthalic anhydride was fused, taking care that the temperature was not raised substantially above 320° F. pending the next stage of the process.

In effecting modification of the resinous material formed as above by effective esterification of the condensate and reaction with the phthalic anhydride, heating of the batch was continued and held to the formation of a clear bead. At that stage and without permitting the material to gel, I added 73 grams of benzoic acid with heating from the maximum temperature of the stage next preceding to a temperature of about 400° F.

The product was in its properties identical with the products similarly produced by successive reactions with a condensate formed from meta-para-cresol and formaldehyde, and was lighter in color than the products made by reactions with a condensate formed from phenol and acetaldehyde. The process was conducted in exactly the same manner, and the same principles and considerations as in Example No. 1 were obtained.

The procedure and materials of Example No. 9 were duplicated down to the last addition, in which stage I added in one instance salicylic acid, and in another instance cinnamic acid. In both cases there were only slight differences in the products so obtained from the product obtained in Example No. 9.

Example No. 10

I mixed 221 grams of commercial (approximately 100%) meta-para-cresol with 165 grams of commercial (approximately 100%) acetaldehyde, and with about 3.5 cc. sodium hydroxide catalyst in a concentration of 250 milligrams per cc. This mixture was refluxed until the first sign of separation of water occurred. Such separation is indicated by clouding in a cooled sample, or region, of the reaction mass; and may be observed for instance in the cooled region of a glass reaction flask forming part of experimental or checking apparatus. Upon the appearance of such cloud, and cooling the batch, an opaque mass of resinous condensate formed, together with an appreciable quantity of free water.

Taking 50 grams of the condensate thus formed, I mixed with it 154 grams of high-test glycerine, forming a homogeneous mass. I then added 148 grams of phthalic anhydride and heated the mixture to such temperature (about 300° F.) that the water of reaction came off as vapor and the phthalic anhydride was fused, taking care that the temperature was not raised substantially above 320° F. pending the next stage of the process.

In effecting modification of the resinous material formed as above by effective esterification of the condensate and reaction with phthalic anhydride, heating of the batch was continued and held to the formation of a clear bead. At that stage and without permitting the material to gel, I added 73 grams of benzoic acid with heating from the maximum temperature of the stage preceding to a temperature of about 400° F.

The product was in its properties identical with the product similarly produced by successive reaction with the condensate formed from phenol and acetaldehyde. The process was conducted in exactly the same manner as in Example No. 1, and the same principles and considerations as in Example No. 1 obtained.

Paralleling the procedure as described in Examples Nos. 1, 2, and 3, I have made to the partial esterification products as produced in Example No. 10 above given, and in variants of that example in which phthalic anhydride was replaced by maleic acid and fumaric acid, addition of the several monocarboxylic acids the use of which is described in Examples Nos. 4 to 8 inclusive, thus similarly making addition of salicylic acid, cinnamic acid, anthranilic acid, and phenyl-acetic acid. The results were consistently similar to those arrived at in Example No. 10, with some variation in color, consistency, and clarity of the product.

Example No. 11

To 100 parts by weight of the resinous product obtained in Example No. 1, I added 100 parts by weight of linseed oil, the temperature of the batch being maintained at about 430° F. while the linseed oil was very slowly added. The product was a coating material of oleoresinous nature having by virtue of its resin content exceptional capacity to acquire gloss and hardness in a film.

Example No. 12

To 100 parts by weight of the resinous product made in accordance with Example No. 4, I added 100 parts by weight of linseed oil, the temperature of the resinous product being maintained at about 430° F. while the linseed oil was very slowly added. The product was a coating material having by virtue of its resin content exceptional capacity to acquire gloss and hardness in a film.

Example No. 13

To 100 parts by weight of the resinous product obtained from the procedure of Example No. 9, I added 100 parts by weight of linseed oil, the temperature of the resinous product being maintained at about 430° F. while the linseed oil was very slowly added. The product was a coating material having by virtue of its resinous content exceptional capacity to acquire gloss and hardness in a film.

The procedure of Examples Nos. 11, 12, and 13 was duplicated, adding, however, 100 parts by weight of soya bean oil in place of the linseed oil added in those examples.

It has been noted that the temperature at which condensation takes place is relatively low, being for example of an order exemplified by reflux conditions such as are typical in making phenol-aldehyde condensates of the infusible "Resite" or "Bakelite" type, in distinction from the fusible, or "Novolak," type condensates. To insure the formation of a condensate of the desired "Resite" type, I use in the initial condensate a phenol selected from the group of phenols consisting of meta-para-cresol, phenol, and xylenol, and do not use the phenolics, such as butylphenol, or para-tertiary amyl-phenol, which tend to give a phenol-aldehyde condensate which is inherently more fusible and which is incapable of imparting to the final products the properties of hardness and gloss typical of the infusible, or "Resite," type phenol-aldehyde condensates.

Although I use an initial condensate inherently possessing full heat-hardening properties, by using an unmodified polyhydric alcohol, by causing that alcohol to solublize the initial condensate, and without the use of added solubilizing agents, I am able to maintain the reaction mass, or batch, in a fusible condition which permits the reaction with the polybasic carboxylic acid appropriately to take place. Also by the avoidance of high temperature in the batch prior to the addition of the aromatic monocarboxylic acid in the final stage, the batch being still in solubilized condition by virtue of the use of unmodified polyhydric alcohol and the conditions of its use, I am enabled to make substantial additions of monocarboxylic acids of the sort to which this present invention relates. The quantity of such monocarboxylic acids which are added is not critical, but as above noted increased quantity tends to increased solubility of the resinous products obtained.

Since in distinction from my previous application, to which reference has been above made, I utilize as the final modifying ingredient of my resin aromatic monocarboxylic acids, I have herein noted and exemplified a relatively great number of such monocarboxylic acids. The employment of various polybasic carboxylic acids in making alkyd modification in phenol-aldehyde resins having been fully developed in the art, I have exemplified herein phthalic anhydride, maleic anhydride, malic acid, and fumaric acid. It is to be understood, however, that any other polybasic carboxylic acid which the art has found to be suitable for the alkyd modification of phenol-aldehyde resins may be employed while conforming to the principles of my invention, and following the procedure of my method as outlined in the examples given above. I may also give as exemplary of polyhydric alcohols other than glycerine, triethylene glycol, diethylene glycol, pentaerythritol, and sorbitol. When used as equivalents for glycerine these alcohols are used in quantities of approximate molar equivalency with the glycerine specifically noted in the examples given above.

An exemplary of aldehydes which may be used, I may name formaldehyde, acetaldehyde, butyraldehyde, propylaldehyde, and crotonaldehyde, all of which I have found suitable. Other unmodified polyhydric alcohols and aldehydes which the art has found suitable for use in the modification or formation of phenol-aldehyde condensates may be used in appropriate molar proportions.

It may be emphasized that the result of my method is to give a resin suitable for various uses, and particularly adapted for use in electrical insulating varnishes and in adhesives in which the initial condensate is a resin of full heat-hardening properties, and in which the advantageous features attendant upon those properties are retained, by so including the polyhydric alcohol and the polybasic carboxylic acid in the batch by which the resin is formed that I am able to obtain the desired sequence of reactions without the addition of any solubilizing agent, such as a resin, or by the addition of a solubilizing acid, such as a monocarboxylic acid prior to the reaction with polybasic carboxylic acid. The product resins thus retain hardness, gloss, and alkali resistance characteristic of molding resins of the full heat-hardening type, in resins suitable for use in adhesives and coatings. In these resins, also, the character of the monocarboxylic acid included as a modifying addition in the process of their manufacture gives the resins effective solubility in a wide range of commercial solvents.

I claim as my invention:

1. The herein described method of producing a modified phenol-aldehyde resin by the sequential steps of forming an initial phenol-aldehyde condensate of the infusible type by refluxing aldehyde with a phenol selected from the group consisting of metapara-cresol, phenol, and xylenol in the presence of an alkaline catalyst in the reacting proportion of at least 1.5 mols. of aldehyde to 1 mol. of the phenol to the stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric alcohol being in excess of the polybasic carboxylic acid and both being in excess of the initial condensate, and with heating to a temperature of about 400° F. making to the partial esterification product thus formed at least one addition of a monocarboxylic acid selected from the class consisting of the aromatic monocarboxylic acids, and mixtures of such acids.

2. The herein described method of producing a modified phenol-formaldehyde resin by the sequential steps of forming an initial phenol-formaldehyde condensate of the infusible type by refluxing formaldehyde with a phenol selected from the group consisting of meta-para-cresol, phenol, and xylenol in the presence of an alkaline catalyst in the reacting proportion of at least 1.5 mols. of formaldehyde, to 1 mol. of the phenol to a stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric alcohol being in excess of the polybasic carboxylic acid and both being in excess of the initial condensate, and with further heating to a temperature of about 400° F. making to the partial esterification product thus formed at least one addition of a monocarboxylic acid selected from the class consisting of the aromatic monocarboxylic acids and mixtures of such acids.

3. The herein described method of producing a modified phenol-aldehyde resin by the sequential steps of forming an initial phenol-aldehyde condensate of the infusible type by refluxing aldehyde with a phenol selected from the group consisting of meta-para-cresol, phenol, and xylenol in the presence of an alkaline catalyst in the reacting proportion of at least 1.5 mols. of aldehyde to 1 mol. of the phenol to the stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric acid being in excess of the polybasic carboxylic acid and both being in excess of the initial condensate, and with heating to a temperature of about 400° F. making to the partial esterification product thus formed at least one addition of benzoic acid.

4. The herein described method of producing a modified phenol-formaldehyde resin by the sequential steps of forming an initial phenol-formaldehyde condensate of the infusible type by refluxing formaldehyde with a phenol selected from the group consisting of meta-para-cresol, phenol, and xylenol, in the presence of an alkaline catalyst in the reacting proportion of at least 1.5 mols. of formaldehyde to 1 mol. of the phenol to a stage at which water separates on cooling, forming an homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric alcohol being in excess of the polybasic carboxylic acid and both being in excess of the initial condensate, and with further heating to a temperature of about 400° F. making to the partial esterification product thus formed at least one addition of benzoic acid.

5. The herein described method of producing a modified phenol-aldehyde resin by the sequential steps of forming an initial phenol-aldehyde condensate of the infusible type by refluxing aldehyde with a phenol selected from the group consisting of meta-para-cresol, phenol, and xylenol in the presence of an alkaline catalyst in the reacting proportion of at least 1.5 mols. of aldehyde to 1 mol. of the phenol to the stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric acid being in excess of the polybasic carboxylic acid and both being in excess of the initial condensate, and with heating to a temperature of about 400° F. making to the partial esterification product thus formed at least one addition of salicylic acid.

6. The herein described method of producing a modified phenol-formaldehyde resin by the sequential steps of forming an initial phenol-formaldehyde condensate of the infusible type by refluxing formaldehyde with a phenol selected from the group consisting of meta-para-cresol, phenol, and xylenol in the presence of an alkaline catalyst in the reacting proportion of at least 1.5 mols. of formaldehyde to 1 mol. of the phenol to a stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric alcohol being in excess of the polybasic carboxylic acid and both being in excess of the initial condensate, and with further heating to a temperature of about 400° F. making to the partial esterification product thus formed at least one addition of salicylic acid.

7. The herein described method of producing a modified phenol-aldehyde resin by the sequential steps of forming an initial phenol-aldehyde condensate of the infusible type by refluxing aldehyde with a phenol selected from the group consisting of meta-para-cresol, phenol, and xylenol in the presence of an alkaline catalyst in the reacting proportion of at least 1.5 mols. of aldehyde to 1 mol. of the phenol to the stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric acid being in excess of the polybasic carboxylic acid and both being in excess of the initial condensate, and with heating to a temperature of about 400° F. making to the partial esterification product thus formed at least one addition of anthranilic acid.

8. The herein described method of producing a modified phenol-formaldehyde resin by the sequential steps of forming an initial phenol-formaldehyde condensate of the infusible type by refluxing formaldehyde with a phenol selected from the group consisting of meta-para-cresol, phenol, and xylenol in the presence of an alkaline catalyst in the reacting proportion of at least 1.5 mols. of formaldehyde to 1 mol. of the phenol to a stage at which water separates on cooling, forming a homogeneous mass of the condensate and an unmodified polyhydric alcohol and reacting the said mass with a polybasic carboxylic acid with heating to a temperature adequate to drive off water and to fuse the polybasic carboxylic acid and not substantially exceeding 320° F. in the absence of a solubilizing agent and holding to a clear bead, in the reaction mass the polyhydric alcohol being in excess of the polybasic carboxylic acid and both being in excess of the initial condensate, and with further heating to a temperature of about 400° F. making to the partial esterification product thus formed at least one addition of anthranilic acid.

SAMUEL S. GUTKIN.